Jan. 20, 1959 L. C. DERMOND 2,869,165
WINDSHIELD CLEANING APPARATUS
Filed June 6, 1956 6 Sheets-Sheet 1
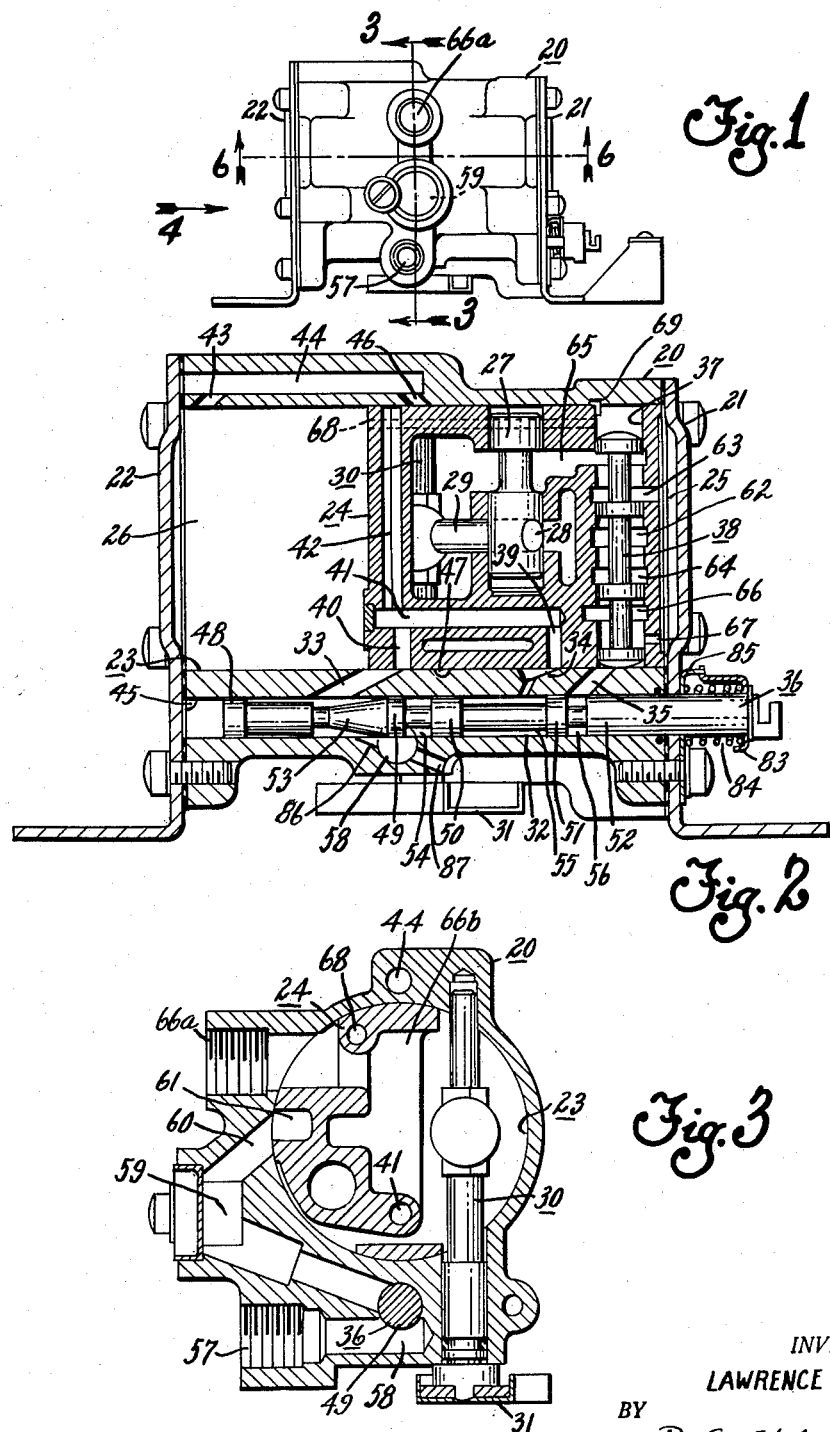
INVENTOR.
LAWRENCE C. DERMOND
BY D. C. Staley
HIS ATTORNEY

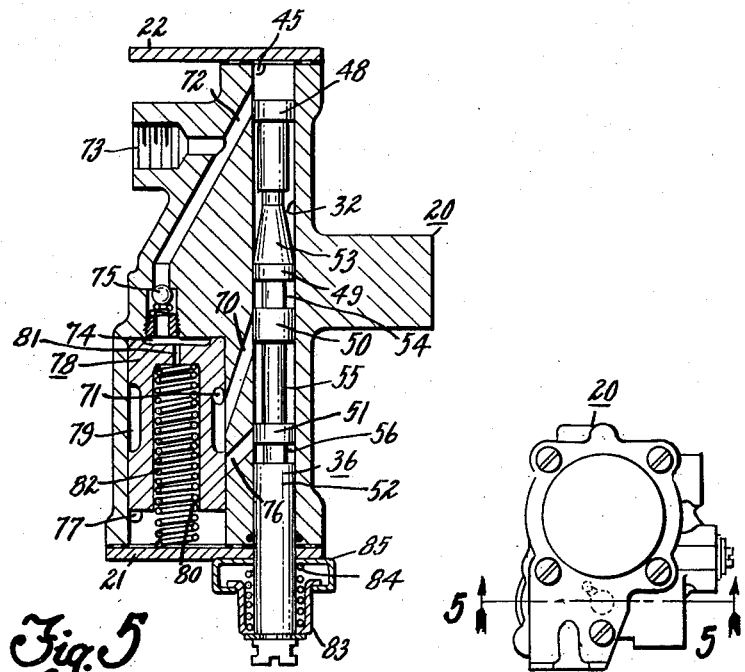
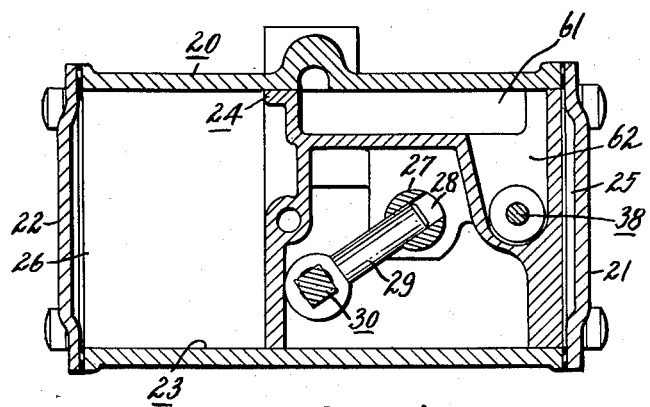

Jan. 20, 1959 L. C. DERMOND 2,869,165
WINDSHIELD CLEANING APPARATUS
Filed June 6, 1956 6 Sheets-Sheet 3

INVENTOR.
LAWRENCE C. DERMOND
BY
D. C. Staley
HIS ATTORNEY

Jan. 20, 1959  L. C. DERMOND  2,869,165
WINDSHIELD CLEANING APPARATUS
Filed June 6, 1956  6 Sheets-Sheet 4

INVENTOR.
LAWRENCE C. DERMOND
BY
D. C. Staley
HIS ATTORNEY

Jan. 20, 1959   L. C. DERMOND   2,869,165
WINDSHIELD CLEANING APPARATUS
Filed June 6, 1956   6 Sheets-Sheet 5

INVENTOR.
LAWRENCE C. DERMOND
BY
D. C. Staley
HIS ATTORNEY

United States Patent Office 2,869,165
Patented Jan. 20, 1959

2,869,165
WINDSHIELD CLEANING APPARATUS

Lawrence C. Dermond, Rochester, N. Y., assignor to General Motors Corporation, Detroit, Mich., a corporation of Delaware Application June 6, 1956, Serial No. 589,754

14 Claims. (Cl. 15—250.4)

This invention pertains to the art of windshield cleaning, and particularly to a fluid pressure operated wiper motor having coordinator means for effecting concurrent operation of a wiper motor and a washer pump.

Heretofore, devices for effecting coordinated operation of a windshield wiper motor and a washer pump have been developed and marketed. These devices are independent of the wiper motor and the washer pump and function to initiate wiper motor operation concurrently with, or shortly after, the delivery stroke of the pump. After completion of the washer delivery stroke, the coordinating device continues operation of the wiper motor for a timed interval so as to dry the windshield, this ordinarily being accomplished by dashpot means. The present invention pertains to coordinator means for fluid pressure operated wiper motors and washer pump wherein the coordinator means are formed with an integral component of the wiper motor. Accordingly, among my objects are the provision of means for coordinating the operation of fluid pressure operated wiper motor means and a fluid pressure operated washer pump; the further provision of means for effecting automatic and coordinated operation of a fluid pressure operated wiper motor and a washer pump; the further provision of means for timing the operation of a fluid pressure operated wiper motor after the delivery stroke of a washer pump is completed; and the still further provision of means for timing the entire interval of wiper motor operation after initiating the wash cycle.

The aforementioned and other objects are accomplished in the present invention by incorporating servo actuated means in the wiper motor assembly for effecting coordinated operation of a wiper motor and a washer. Specifically, the wiper motor, per se, is of the type disclosed in my copending applications Serial Nos. 409,332, filed February 10, 1954, now Patent No. 2,789,544, and 513,- 519, filed June 6, 1955. Accordingly, both embodiments of the instant invention of the wiper motor includes a cylinder having a reciprocable piston therein capable of fluid pressure actuation in both directions. The piston carries servo actuated reversing valve means which are automatically operated adjacent the normal stroke ends of the piston, and a manual control valve is reciprocably mounted within the cylinder for controlling the speed of motor operation and for parking the motor piston beyond one of its normal stroke ends.

In the preferred embodiment, the coordinating means are designed for use with a washer pump having a fluid pressure actuated intake stroke and a spring actuated delivery stroke. The coordinator and timing means includes a spring-biased plunger having a bleed orifice in the head thereof. When the manual control valve is depressed for automatic washer-wiper operation, the plunger is moved by fluid under pressure to compress the spring and thereby complete the flow path to initiate operation of the wiper motor. At the same time, the intake stroke of the washer pump is effected and when the manual control knob is released, the delivery stroke of the pump commences and operation of the wiper motor is timed by the spring-biased plunger and bleed orifice therein which constitute dashpot means. In this embodiment, the entire cycle of wiper motor operation is timed, and since the passage between the plunger and the manual control valve is closed by a check valve, the plunger returns to its normal position under the urge of the spring and when it is moved to its normal position, the wiper motor will stop in its parked position where it is biased by pressure fluid. Preferably, the wiper motor completes several strokes after completion of the pump delivery stroke so as to dry the windshield.

In the second embodiment, the coordinating means are designed for use with a washer pump having a spring actuated intake stroke and a fluid pressure effected delivery stroke. The coordinator and timing means, likewise, includes a spring-biased plunger having a bleed orifice in the head thereof, this mechanism being similar to that disclosed in copending application, Serial No. 526,294, Kelley, et al., filed August 3, 1955, and assigned to the assignee of this invention. In the second embodiment, the control valve must be continually depressed to complete the delivery stroke of the washer pump. In so doing, the spring-biased plunger is moved, compressing the spring and completing the flow path to the washer pump and the wiper motor. Upon completion of the pump delivery stroke, the total fluid pressures acting on opposite sides of the plunger will become equal, and the spring will slowly move the plunger to its normal position, thereby timing operation of the wiper motor only after completion of the pump delivery stroke. Thereafter, the pump intake spring will force the fluid to drain.

Further objects and advantages of the present invention will be apparent from the following description, reference being had to the accompanying drawings wherein preferred embodiments of the present invention are clearly shown.

In the drawings:

Fig. 1 is a view, in elevation, of one embodiment of the combined windshield wiper motor and washer actuator of this invention.

Fig. 2 is a longitudinal sectional view of the motor assembly of Fig. 1.

Fig. 3 is an enlarged sectional view taken along line 3—3 of Fig. 1.

Fig. 4 is an end view in elevation taken in the direction of arrow 4 in Fig. 1.

Fig. 5 is a sectional view taken along line 5—5 of Fig. 4.

Fig. 6 is an enlarged sectional view taken along line 6—6 of Fig. 1.

Figure 7:
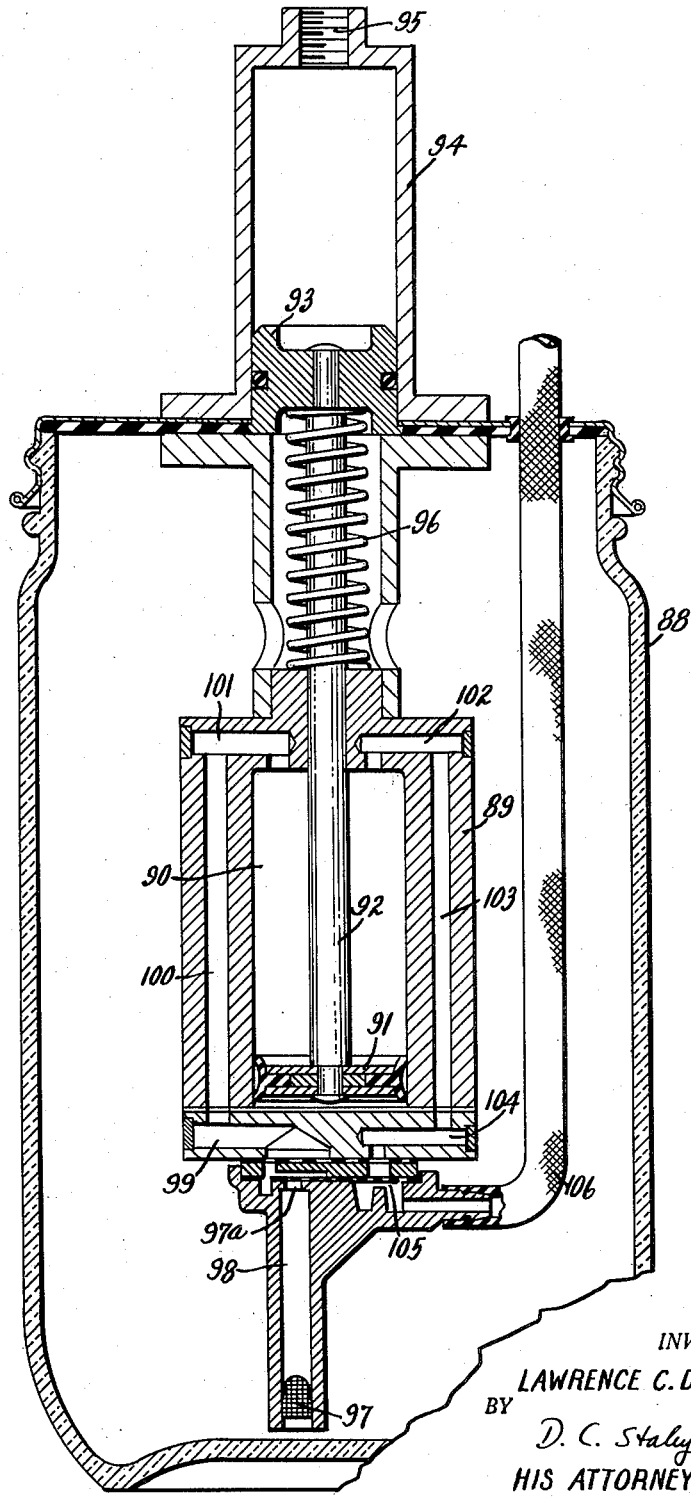
Fig. 7 is a fragmentary sectional view of the washer pump designed for use with the assembly of Figs. 1 through 6.
Figure 8:
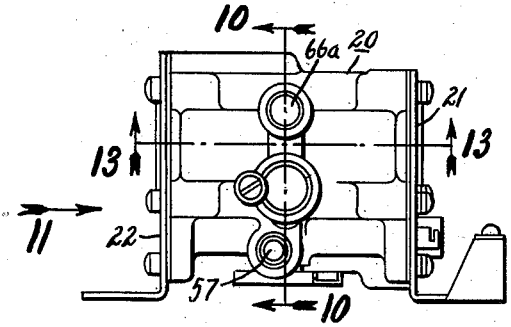
Fig. 8 is a view, in elevation, of the second embodiment of the wiper motor and washer actuator assembly.

With particular reference to Figs. 1 through 6, the preferred embodiment of the windshield wiper motor and washer actuator will be described. The wiper motor includes a body, or housing, 20, the ends of which are closed by plates 21 and 22. The housing 20 has a bore 23, as shown in Fig. 2, constituting a working cylinder. A reciprocable piston 24 is disposed within the cylinder bore 23 and divides the bore into a pair of opposed expansible chambers 25 and 26. As seen in Fig. 6, the piston 24 carries a rotatable trunnion 27 having a diametrical opening 28 therethrough which receives a crank arm 29 attached to an oscillatable output shaft 30. One end of the shaft 30 extends outside of the housing 20, as shown in Fig. 3, and has a channeled shaped connector 31 attached thereto. The housing 20 is also formed with a manual control valve bore 32, which is spaced from but parallel with the cylinder bore 23. The valve bore, or guide, 32 is connected with the cylinder bore 23 by a plurality of passages 33, 34 and 35, as seen in Fig. 2. A manually operable control valve 36 is mounted for reciprocable movement within the valve guide 32.

The piston 24 is formed with a transversely extending bore or valve guide 37, within which a servo actuated reversing, or shuttle valve, 38 is disposed. In addition, the piston has formed therein passages 39, 40, 41 and 42, which cooperate with passages 33, 34, 35, 43, 44 and 46 in the housing 20.

The control valve 36 is formed with spaced sealing lands 48, 49, 50, 51 and 52. The lands 48 and 49 are separated by a throttling surface 53; the lands 49 and 50 are separated by an annular groove 54; the lands 50 and 51 are separated by an annular groove 55; and the lands 51 and 52 are separated by an annular groove 56. As seen in Fig. 3, fluid under pressure is supplied to the housing 20 through port 57, which connects with the valve guide through passage 58. The valve guide 32 is connected by a passage 59 with a port 60 communicating with the cylinder bore 23. The port 60 always communicates with a piston passage 61 connecting with a pressure inlet port 62 in the valve guide 37. In addition, the valve guide 37 includes outlet ports 63 and 64, which are connected, respectively to cylinder chambers 25 and 26. In addition, the valve guide 37 is connected with a pair of drain passages 65 and 66, which communicate at all times through the piston 24 with a drain port 66a. Moreover, in accordance with the teachings of the aforementioned Serial No. 513,519, the lower end of the valve guide 37 is connected to the cylinder chamber 25 through passage 67 and the upper end of the valve guide 37 is connected to cylinder chamber 26 through passage means 68. In addition, with the piston 24 in the position of Fig. 2, the upper end of valve guide 37 is connected to drain through a passage 69. When the piston 24 is at the other end of its working stroke, the lower end of valve guide 37 is connected to drain through a groove 47 in the cylinder bore 23 that communicates with the drain cavity 66b of the piston 24 and the drain port 66a.

The piston 24 is shown in its parked position in Fig. 2, that is, the piston is positioned beyond one end of its normal running stroke, and the control valve 36 is in the "off" position. When the control valve 36 is moved to the right, as viewed in Fig. 2, so as to interconnect passages 34 and 35 through the annular groove 55, pressure fluid from passage 58 will flow through passage 33, and passages 40, 41 and 39 to passage 34, through annular groove 55 to passage 35 so as to move the reversing valve 38 upwardly. In this instance, fluid under pressure from supply port 62 is admitted to cylinder chamber 25, while cylinder chamber 26 is connected to drain through port 64, port 66 and drain port 66a. Accordingly, the piston 24 will move to the left, as viewed in Fig. 2. As the piston 24 approaches the end plate 22, the passage 42 will communicate with passage 43, and pressure fluid will flow from passage 58 through passages 33, 39, 41, 42, 43, 44 and 46 to the upper end of the valve guide 37 so as to move the reversing valve 38 downwardly. Accordingly, cylinder chamber 26 will be connected to pressure from pressure inlet port 62 through port 64 and cylinder chamber 25 will be connected to drain. Thus, the piston 24 will move to the right and will be maintained in a state of continuous reciprocation. The speed of piston reciprocation is determined by the position of the throttling surface 53 relative to the passage 58.

When the control valve 36 is moved to the "off" position, as shown in Fig. 2, it will be seen that communication between passages 34 and 35 is blocked by the land 51 so that the reversing valve 38 cannot be moved upwardly. Accordingly, at this time, the stroke of the piston 24 will be extended to the right, as viewed in Fig. 2, beyond its normal stroke end, and will come to rest in the position depicted in Fig. 2.

With particular reference to Fig. 5, the valve guide 32 is formed with a drain port 45 adjacent the end closed by plate 22. In addition, this end of the valve guide communicates with a passage 72 that connects with a washer outlet port 73. The passage 72 also connects with a servo chamber 74 through a one-way ball type check valve 75. The servo chamber 74 is interconnected with the valve guide 32 by passages 70 and 76. In addition, the servo chamber 74 is connected to drain through ports 71 and 77. A plunger 78 having an intermediate annular groove 79 and an internal recess 80 is reciprocably disposed within the servo chamber 74. The plunger 78 has a small bleed orifice 81 in the head surface thereof and is biased to the position shown in Fig. 5 by a compression spring 82.

The control valve 36 carries a cap member 83, which constitutes a seat for one end of a compression spring 84 encompassing the control valve 36. The other end of the compression spring seats against a flange-shaped cup member 85, likewise, attached to the valve member 36. The spring 84 normally maintains the flange of the cup-shaped member 83 in engagement with the flange of the cup-shaped member 85. However, when the control valve 36 is in the "off" position, as seen in Figs. 2 and 5, the control valve plunger 36 can be depressed against compression spring 84, thereby moving the cup-shaped member 83 relative to the cup-shaped member 85. In so doing, the passage 72 is connected to the pressure souce from passage 58 through drilled passage 86, which intersects the passage 58, one end of the drilled passage being closed by a plug 87. Thus, pressure fluid will be supplied to the port 73 and also to the servo chamber 74, which causes the plunger 78 to move downward into engagement with the plate 21. When the plunger 78 is in engagement with the plate 21, the drain port 71 is blocked by the upper plunger land, and passages 70 and 76 are interconnected. Since passage 70 connects with the annular groove 55 of the control valve, which is connected by means of passages 34, 39, 41, 40 and 33 to the pressure passage 58 through drilled passage 86, pressure fluid will be applied through annular groove 56 to the lower end of the valve guide 37, thereby initiating operation of the wiper motor.

With particular reference to Fig. 7, the wiper motor and washer actuator disclosed in Figs. 1 through 6 is designed for use with a washer pump including a liquid solvent reservoir 88 having a pump housing 89 disposed therein. The pump housing includes a pumping chamber 90 having a reciprocable piston 91 therein, which is connected by a rod 92 to a motor piston 93. The motor piston is disposed within a cylinder 94 having a port 95 adapted for connection with the washer port 73. In Fig. 7, the motor piston 93 is shown in the position it assumes after completion of the intake stroke. In other words, the cylinder 94 is pressurized by fluid from the wiper motor through ports 73 and 95. During downward movement of the piston 93, the piston 91 is, likewise, moved downwardly by the rod 92, thereby compressing a spring 96 interposed between the piston 93 and the pump housing 89. During the intake stroke of the pump, solvent is drawn thorugh a screen 97 in the intake pipe 98, a check valve 97a, and passages 99, 100 and 101 to the pumping chamber 90. When the port 95 is connected to drain through port 73, passage 72 and port 45, the spring 96 will effect upward movement of the pistons 91 and 93, thereby discharging liquid solvent through passages 102, 103 and 104 through check valve 105 to the delivery conduit 106 which connects with the washer nozzles of a motor vehicle, not shown.

When the manual control valve 36 is released so that the spring 84 moves it to the position shown in Figs. 2 and 5, the pressure fluid above the plunger 78 in the servo chamber 74 will slowly pass through the bleed orifice 81 under the urge of spring 82 so that the plunger 78 will gradually return to its normal position, as shown in Fig. 5. However, until drain port 71 is uncovered by the upper land of the plunger 78, operation of the wiper motor will continue. As soon as the lower land on the plunger 78 closes the passage 76, the wiper motor piston 24 will be moved to the parked position, as seen in Fig. 2. Thus, the coordinator means of the first embodiment of this invention initiates operation of the wiper motor when the delivery stroke of the washer pump is begun, and times the operation of the wiper motor during the delivery stroke of the pump, the timing being accomplished by the dashpot means comprising the spring 82 and the bleed orifice 81. Preferably, the size of the bleed orifice 81 is chosen so that the wiper motor piston 24 will make several strokes after completion of the washer pump delivery stroke so as to dry the windshield.

Figure 9:
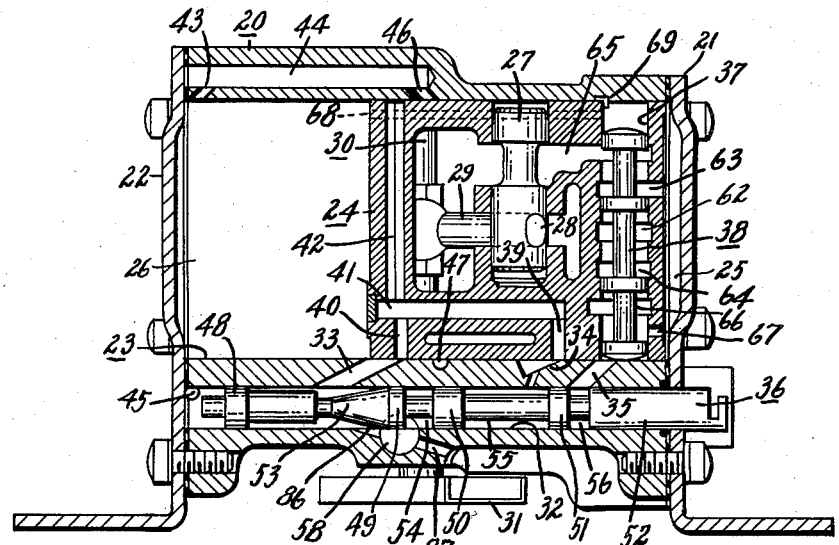
Fig. 9 is an enlarged longitudinal sectional view of the second embodiment of the assembly.
Figure 12:
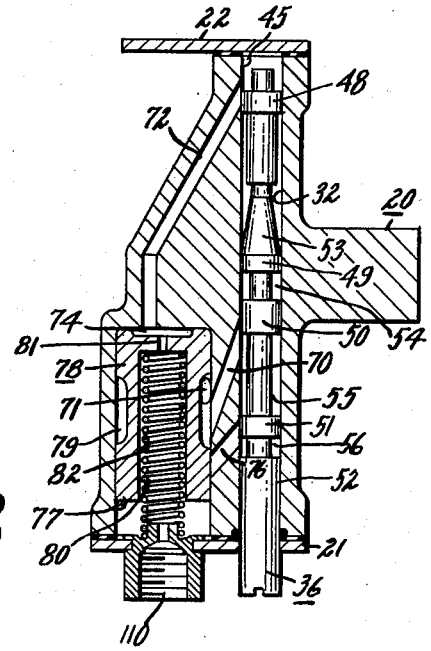
Fig. 12 is a sectional view taken along line 12—12 of Fig. 11.
Figure 11:
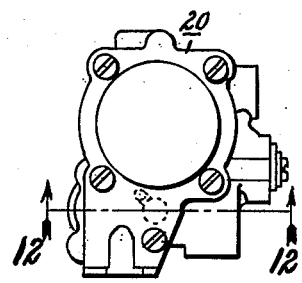
Fig. 11 is an end view in elevation taken in the direction of arrow 11 in Fig. 8.
Figure 13:
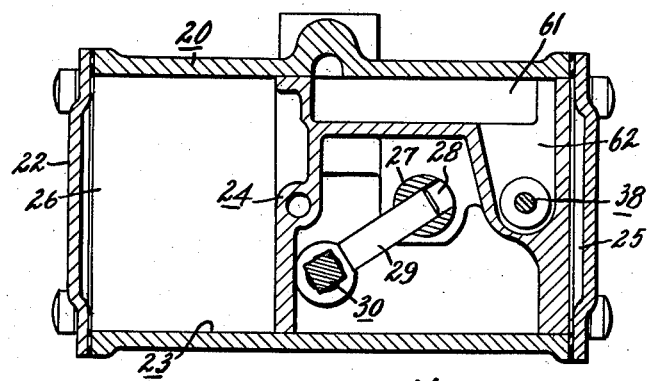
Fig. 13 is an enlarged sectional view taken along line 13—13 of Fig. 8.
Figure 14:
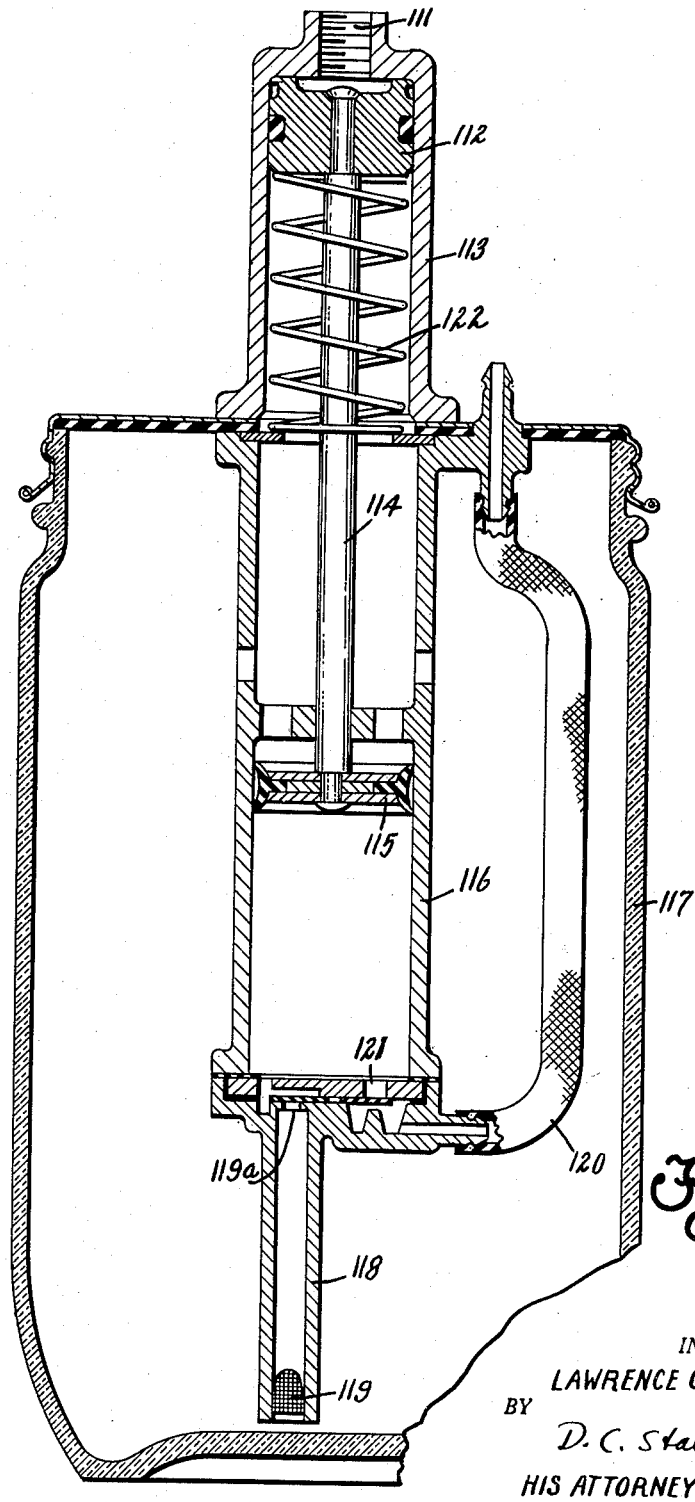
Fig. 14 is a fragmentary sectional view of the washer pump designed for use with the assembly of Figs. 8 through 13.

With particular reference to Figs. 8 through 14, the second embodiment of the present invention will be described, similar numerals depicting the several parts throughout the several views. The wiper motor and washer actuator assembly disclosed in Figs. 8 through 13 is identical with that disclosed in Figs. 1 through 5, except for the washer actuator and manual control valve. In the second embodiment, the assembly is designed for use with a washer pump having a hydraulically actuated delivery stroke and a spring actuated intake stroke. Moreover, in the embodiment, the manual control valve 36 must be continually depressed throughout the delivery stroke, since when the manual control valve 36 is depressed, fluid under pressure from passage 58 flows through drillway 86 to passage 72, as seen in Figs. 9 and 12, and to the servo chamber 74, thereby effecting downward movement of the plunger 78. At the same time, fluid under pressure flows through orifice 81 to the outlet port 110, which is connected by a conduit, not shown, to the inlet port 111 of the washer pump depicted in Fig. 14. When the servo piston 78 moves downwardly from the position shown in Fig. 10, passages 70 and 76 are interconnected, and ports 71 and 77 are blocked whereby the wiper motor will be activated. Pressure fluid flowing through port 111 effects downard movement of a washer motor piston 112 disposed within a casing 113. The piston 112 is connected by a rod 114 to a pump piston 115 disposed within a casing 116. The casing 116 is disposed within a liquid solvent reservoir 117, and communicates with an intake pipe 118 through a screen 119 and a check valve 119a, and with outlet conduit 120 through a check valve 121. Accordingly, upon downward movement of the pistons 112 and 115, liquid solvent will be discharged onto the windshield in a conventional manner.

Figure 10:
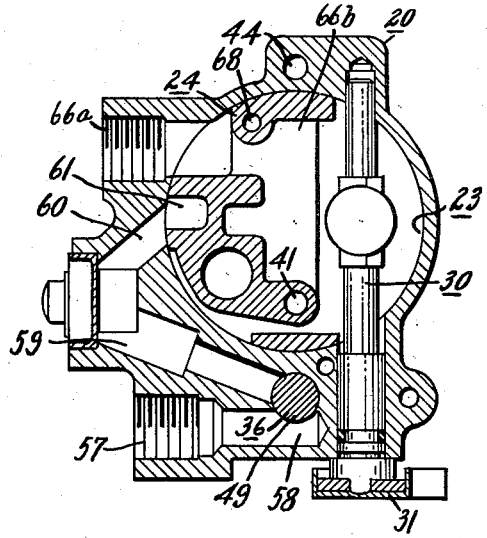
Fig. 10 is an enlarged sectional view taken along line 10—10 of Fig. 8.

When the manual control valve 36 is moved back to the "off" position, the passage 72 is disconnected from the source of pressure fluid and since at this time, the total fluid pressures on opposite sides of the servo plunger 78 are equal, the spring 82 will gradually move the plunger 78 back to the position of Fig. 10. When the servo plunger 78 assumes its Fig. 10 position, communication between passages 70 and 76 will be interrupted, with passage 70 connected to drain port 71 through annular groove 79 so that the wiper motor will be parked. Thereafter, spring 122 within the casing 113 will effect upward movement of the pistons 112 and 115 to complete the intake stroke of the washer pump and discharge the fluid in the casing 113 to drain through ports 111, 110, and drain port 77.

From the foregoing, it is apparent that the present invention results in a unique wiper motor and washer actuator assembly of compact design which can be employed to effect automatic and coordinated operation of a windshield wiper and a washer pump. Moreover, in one embodiment, operation of the wiper motor is timed during the entire wash cycle, as well as for a short period thereafter, while in the second embodiment, operation of the wiper motors is only timed after completion of the delivery storke of the washer pump.

While the embodiments of the present invention as herein disclosed, constitute preferred forms, it is to be understood that other forms might be adopted.

What is claimed is as follows:

1. A windshield cleaning system including in combination, a fluid pressure operated motor and washer pump combination including means connecting the motor and the pump, a windshield wiper motor and actuator assembly comprising, a housing having a bore therein, a movable member disposed within said bore capable of fluid pressure actuation in both directions, reversing valve means for maintaining said member in a state of continuous movement and manual control valve means for interrupting operation of said reversing valve means so as to park said movable member, and valve means controlled by said manual control valve means for effecting simultaneous operation of said motor and washer pump combination and said wiper motor.

2. A windshield cleaning system including in combination, a fluid pressure operated motor and washer pump combination including means connecting the motor and the pump, a windshield wiper motor and actuator assembly, comprising, a housing having a bore therein, a movable member disposed within said bore capable of fluid pressure actuation in both directions, reversing valve means for maintaining said member in a state of continuous movement throughout a running stroke and manual control valve means for interrupting operation of said reversing valve means and extending the stroke of said member beyond said running stroke to park said member, and servo actuated valve means controlled by said manual control valve means for initiating simultaneous operation of said motor and washer pump combination and said wiper motor and timing the operation of said wiper motor.

3. A windshield cleaning system including in combination, a fluid pressure operated motor and washer pump combination including means connecting the motor and the pump, a windshield wiper motor and actuator assembly, comprising, a housing having a bore therein, a movable member disposed within said bore capable of fluid pressure actuation in both directions, servo actuated reversing valve means for maintaining said member in a state of continuous movement throughout a running range and manual control valve means for interrupting operation of said reversing valve means so as to extend the stroke of said member beyond said running range and park the member, and servo actuated valve means controlled by said manual control valve means for effecting simultaneous operation of said motor and washer pump combination and said wiper motor.

4. A windshield cleaning system including in combination, a fluid pressure operated motor and washer pump combination including means connecting the motor and the pump, a windshield wiper motor and actuator assembly, comprising, a housing having a bore therein, a movable member disposed within said bore capable of fluid pressure actuation in both directions, said member dividing said bore into two chambers, reversing valve means for alternately directing pressure fluid to opposite chambers of said bore to effect continuous movement of said member and manual control valve means for interrupting operation of said reversing valve means so as to park said movable member, and servo actuated valve means controlled by said manual control valve means for effecting simultaneous operation of said motor and washer pump combination and said wiper motor and timing the operation of said wiper motor.

5. A windshield cleaning system including in combination, a fluid pressure operated motor and washer pump combination including means connecting the motor and the pump, a windshield wiper motor and actuator assembly, comprising, a housing having a bore therein, a movable member disposed within said bore capable of fluid pressure actuation in both directions, said membed dividing said bore into two chambers, servo actuated reversing valve means carried by said member and movable relative thereto and alternately directing pressure fluid to opposite chambers of said bore so as to effect movement of said member throughout a running range and manual control valve means for interrupting operation of said reversing valve means to extend the stroke of said member outside of said running range, and valve means controlled by said manual control valve means for effecting simultaneous operation of said motor and washer pump combination and said wiper motor.

6. A windshield cleaning system including in combination, a fluid pressure operated motor and washer pump combination including means connecting the motor and the pump, a windshield wiper motor and actuator assembly, comprising, a housing having a bore therein, a reciprocable piston disposed in said bore, said piston dividing said bore into two chambers, servo actuated reversing valve means carried by the piston and movable relative thereto for alternately directing pressure fluid to opposite chambers of said bore so as to effect continuous piston movement throughout a running range and manual control valve means for interrupting operation of said reversing valve means to park the piston outside of said running range, and valve means controlled by said manual control valve means for effecting simultaneous operation of said motor and washer pump combination and said wiper motor.

7. A windshield cleaning system including in combination, a fluid pressure operated motor and washer pump combination including means connecting the motor and the pump, a windshield wiper motor and actuator assembly, comprising, a housing having a bore therein, a reciprocable piston disposed in said bore, said piston dividing said bore into two chambers, servo actuated reversing valve means carried by the piston and movable relative thereto for alternately directing pressure fluid to opposite chambers of said bore so as to effect continuous piston movement throughout a running range and manual control valve means operable to prevent servo actuation of said reversing valve means in one direction extend the stroke of said piston outside of the running range, and servo actuated valve means controlled by said manual control means for initiating operation of said motor and washer pump combination and said wiper motor and timing the operation of said wiper motor.

8. A windshield cleaning system including in combination, a fluid pressure operated motor and washer pump combination including means connecting the motor and the pump, a windshield wiper motor and actuator assembly, comprising, a housing having a bore therein, a reciprocable piston disposed in said bore, said piston dividing said bore into two chambers, servo actuated reversing valve means carried by the piston and movable relative thereto for alternately directing pressure fluid to opposite chambers of said bore so as to effect continuous piston movement throughout a running range and manual control valve means having an "on" position, an "off" position for interrupting operation of said reversing valve means and a "wash" position, and valve means actuated when said manual control valve means is in the "wash" position for effecting simultaneous operation of said motor and washer pump combination and said wiper motor.

9. The combination set forth in claim 8 wherein said last recited valve means includes a servo actuated plunger.

10. The combination set forth in claim 9 wherein said servo actuated plunger has a bleed orifice in the head thereof and is spring-biased in one direction.

11. The combination set forth in claim 8 wherein said washer pump has a fluid pressure effected delivery stroke and a spring actuated intake stroke, and wherein said last recited valve means times the interval of wiper motor operation after completion of said delivery stroke.

12. The combination set forth in claim 8 wherein said washer pump has a fluid pressure effected intake stroke and a spring actuated delivery stroke, and wherein said last recited valve means times the interval of wiper motor operation commencing with initiation of the delivery stroke of said washer.

13. The combination set forth in claim 12 wherein said manual control valve means includes yieldable stop means when it is in the "off" position, whereby the manual control valve means may be depressed to the "wash" position and will automatically return to the "off" position when released.

14. The combination set forth in claim 8 wherein said last recited valve means, when actuated, completes a flow path to the reversing valve means of said motor with the manual control valve means in the "off" position.

References Cited in the file of this patent

UNITED STATES PATENTS

| | | |
|---|---|---|
| 2,743,473 | Oishei | May 1, 1956 |
| 2,769,194 | Oishei | Nov. 6, 1956 |
| 2,789,544 | Dermond | Apr. 23, 1957 |